B. L. YOUNG.
SAFETY SHUTTER FOR MOVING PICTURE APPARATUS.
APPLICATION FILED JAN. 19, 1921.
1,406,802.
Patented Feb. 14, 1922.
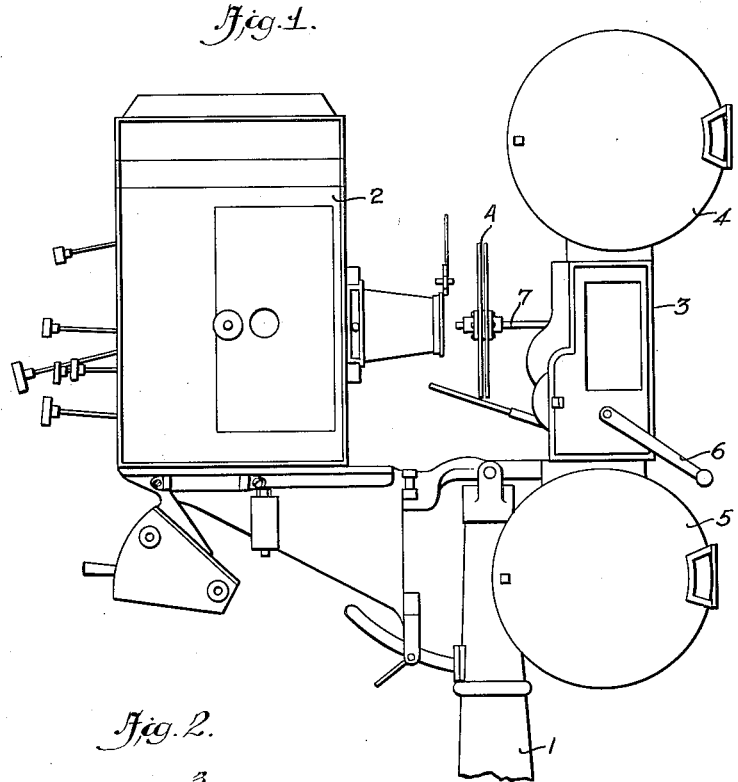
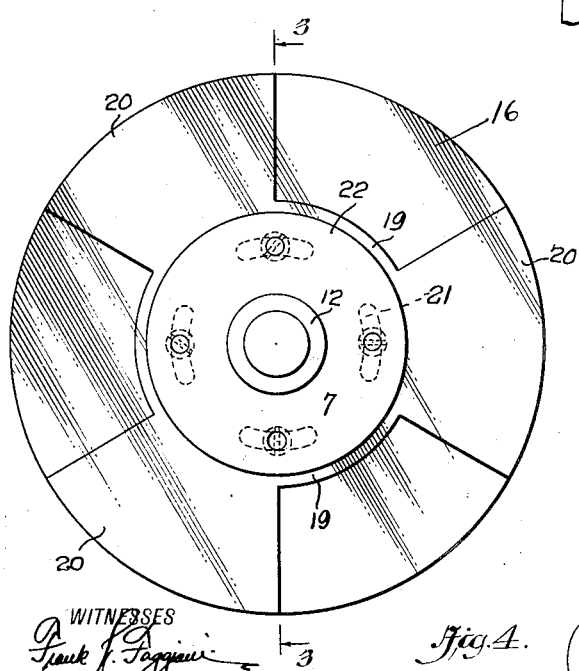
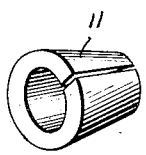
INVENTOR
BENJAMIN L. YOUNG
ATTORNEYS

UNITED STATES PATENT OFFICE.

BENJAMIN L. YOUNG, OF ST. JOSEPH, MISSOURI.

SAFETY SHUTTER FOR MOVING-PICTURE APPARATUS.

1,406,802.   Specification of Letters Patent.   Patented Feb. 14, 1922.

Application filed January 19, 1921. Serial No. 438,422.

*To all whom it may concern:*

Be it known that I, BENJAMIN L. YOUNG, a citizen of the United States, and a resident of St. Joseph, in the county of Buchanan and State of Missouri, have invented a new and Improved Safety Shutter for Moving-Picture Apparatus, of which the following is a full, clear, and exact description.

This invention relates to moving picture shutters, and has for an object the provision of a screen or shutter unit which, during its operation, protects the film by intercepting a substantial percentage of the heat in the light rays striking the film while at the same time permitting a proper amount of light to pass to the film.

Another object of the invention resides in the provision of a shutter unit which can be readily assembled on and taken off the shutter shaft with a minimum expenditure of time and labor.

A further object resides in the provision of a shutter unit in which the elements comprising the unit can be quickly and readily adjusted relative to each other.

A still further object of the invention resides in the provision of a shutter by reason of the construction of which a certain amount of the heat of the light directed toward the film is absorbed by the shutter regardless of the position thereof.

Another object resides in the provision of a shutter in which the desired amount of the heat of the light directed toward the film is absorbed by the shutter and rapidly and efficiently radiated therefrom.

A further object resides in the particular construction and arrangement of parts hereinafter described and claimed and shown in the accompanying drawings.

The invention, in general, comprises a simple screen or shutter unit mounting which is composed of a minimum number of parts which can be readily assembled on the shutter shaft and which is readily adapted to receive one or more shutter units. These units are also provided with means connecting the same whereby they can be relatively adjusted.

As the shutter rotates, it interposes sections of the shutter in the path of the light ray, certain of which permit the passage of the light but extract a substantial amount of heat from the ray, and others of which not only absorb a substantial amount of the heat but intercept the light.

The invention is illustrated in the drawings, of which—

Figure 1 represents a moving picture projector of a well-known type showing the shutter unit in place;

Figure 2 is an end elevation of the shutter;

Figure 3 is a transverse vertical section taken on the line 3—3 of Figure 2; and Figure 4 is a detail perspective view of one of the elements included in the shutter mounting or support.

The invention as illustrated in the drawings is applied to a moving picture projection apparatus comprising a standard 1 on which the arc light casing 2 is disposed, as well as the projection head 3. The film passes through the projection head from the reel 4 to the reel 5. A suitable handle 6 operates the mechanism to move the film and a shutter shaft 7 on which a shutter or screen unit made in accordance with my invention is mounted. This shutter, represented by the letter A in Figure 1, is disposed in the line of light from the arc light casing to the projecting head between the head and the casing and is mounted quite some distance away from the film, in the neighborhood of six or eight inches, so that there is plenty of free space around the shutter during its rotation to permit a free circulation of air to carry off the heat distributed by the shutter.

The shutter in particular is constructed and mounted on the shutter shaft 7, as shown in Figures 2 and 3. The shutter shaft is provided with a threaded sleeve 8 normally slidable on the shaft 7. The inner end 9 of this sleeve is threaded and has a reduced shoulder portion 10 adapted to engage with an abutting face of a split cone locking wedge 11 which is adapted to be placed over the shaft 7 adjacent the end of the sleeve 8. An outer sleeve 12 is threaded interiorly at one end and is cone-shaped at the other end 13, and is adapted to contact with the locking wedge 11 along its tapered portion and to be threaded on to the sleeve 8, whereby the sleeves 8 and 12 and the locking wedge 11 are firmly connected to the shutter shaft and yet so connected as to be readily disconnected therefrom by merely unscrewing the sleeve 12.

The sleeve 12, adjacent its threaded end, is provided with a flange portion 14 extending in a plane at right angles to the axis of the shutter shaft 7. This flange portion 14 is suitably tapped at intervals to provide for the reception of set screws, the operation of which is to be hereinafter described. The outer surface of the sleeve 12 adjacent the flange 14 is cylindrical and is adapted to receive a disk of glass 16. This glass is preferably of such character as to be optically perfect, and is of such diameter as to intercept light rays extending between the arc light casing 2 and the projecting head 3. Washers 17 and 18 of flexible material are disposed on either side of the glass disk 16 to absorb any shocks to which it may be subjected, and also to hold it in place. These washers are provided with suitable apertures for the passage therethrough of the set screws 15. A metal shutter 19 is disposed adjacent the transparent disk 16 and is provided with a plurality of vanes or blades 20 arranged at suitable angular distances apart around the periphery of the shutter 19. The shutter 19 is provided with a plurality of slots 21 adapted to receive the set screws 15 and by reason of which the shutter 19 may be angularly moved for local adjustment with respect to the disk 16 and the shaft 7 without removing the set screws or changing the position of the unit on the shaft. A collar 22 is disposed against one face of the shutter 19 and is provided with apertures through which pass the set screws 15, the heads 23 of the set screws bearing against the collar 22. By reason of the interposition of the washers 18 between the shutter 19 and the disk 16, an air space is provided which enhances the radiation of heat absorbed by the disk 16 and the vanes 20 during the rotation of the unit. It is obvious that by interposing this disk of glass and the metal shutter between the film and the arc a considerable portion of the heat of the light rays will be absorbed and properly radiated by the shutter unit and, therefore, cannot injuriously affect the film.

It will be further observed that after the unit is assembled it can be removed from the shaft merely by unscrewing the sleeve 12 from the sleeve 8 without disconnecting or disturbing the angular relative positions of the disk 16 and the shutter 19 mounted on the sleeve 12. This ready means of disassembling the unit enhances the value and the efficiency of its use.

It will, therefore, be observed from a consideration of the above description that this shutter unit, in whatever position it may be at any instant, whether moving or stationary, will always interpose in the path of the light a surface which will absorb a certain percentage of the heat of the light ray. This surface in some cases will, in addition, prevent the passage of the light, whereas in other cases it will permit the passage of the light. In any case, a certain minimum percentage of the heat is absorbed by the shutter, and due to its rapid movement and to its spacing apart from other parts of the machine in open free air, it will quickly radiate the heat thus absorbed.

What I claim is:

1. A safety shutter for moving picture machines, which comprises a rotating metallic disk having a plurality of spaced vanes, in combination with a solid disk of optically transparent material spaced adjacent the metallic disk and moving therewith.

2. A safety shutter unit for moving picture apparatus, which comprises a shutter shaft, a mounting for the shutter adapted to be disposed on said shaft and to move therewith, a solid disk of glass disposed on said mounting, a metallic disk disposed on said mounting adjacent the glass disk, a plurality of vanes on said metallic disk disposed to cover certain portions of the glass disk.

3. A safety shutter unit for moving picture apparatus, which comprises a shutter shaft, a mounting for the shutter adapted to be disposed on said shaft and to move therewith, a solid disk of glass disposed on said mounting, a metallic disk disposed on said mounting adjacent the glass disk, a plurality of vanes on said metallic disk disposed to cover certain portion of the glass disk, and means for adjusting the metallic disk with respect to the glass disk.

4. A safety shutter unit for moving picture apparatus, which comprises a shutter shaft, a sleeve loosely disposed on said shaft and exteriorly threaded at one end, a tapered, split locking cone disposed on said shaft adjacent the threaded end of said sleeve, a shutter-supporting sleeve interiorly threaded at one end and adapted to be disposed on the shaft and threaded on one end of the first-mentioned sleeve, said shutter-supporting sleeve provided with a tapered bore at one end adapted to engage with the tapered, split locking cone to lock itself to the first-mentioned sleeve and the shutter shaft, an angular shoulder disposed at one end of said shutter-supporting sleeve extending into a plane at right angles to the axis of the shaft, a solid glass disk suitably apertured to be disposed on the shutter-supporting sleeve adjacent the shoulder, a metallic disk disposed on the shutter-supporting sleeve adjacent the glass disk, washers of flexible material disposed between the shoulder, the glass disk and the metallic disk, a locking collar disposed on one side of the metallic disk, said shoulder, collars and disks provided with apertures, and a locking screw extending through said apertures and engaging the shoulder to clamp the collars and disks on the shutter-supporting sleeve.

5. A safety shutter unit for moving picture apparatus, which comprises a shutter shaft, a sleeve loosely disposed on said shaft and exteriorly threaded at one end, a tapered, split locking cone disposed on said shaft adjacent the threaded end of said sleeve, a shutter-supporting sleeve interiorly threaded at one end and adapted to be disposed on the shaft and threaded on one end of the first-mentioned sleeve, said shutter-supporting sleeve provided with a tapered bore at one end and adapted to engage with the tapered, split locking cone to lock itself to the first-mentioned sleeve and the shutter shaft, an angular shoulder disposed at one end of said shutter-supporting sleeve extending into a plane at right angles to the axis of the shaft, a solid glass disk suitably apertured to be disposed on the shutter-supporting sleeve adjacent the shoulder, a metallic disk disposed on the shutter-supporting sleeve adjacent the glass disk, washers of flexible material disposed between the shoulder, the glass disk and the metallic disk, a locking collar disposed on one side of the metallic disk, said shoulder, collars and disks provided with apertures, a locking screw extending through said apertures and engaging the shoulder to clamp the collars and disks on the shutter-supporting sleeve, and a plurality of spaced vanes on the metallic disk adapted to be disposed adjacent to and to cover certain portions of the glass disk.

BENJAMIN L. YOUNG.